July 23, 1968  R. G. BRIGHT  3,394,044
SEALING STRIP FOR U-SHAPED CHANNEL
Filed Jan. 18, 1966  2 Sheets-Sheet 1

ROBERT GRANVILLE BRIGHT
INVENTOR

BY
DEAN, FAIRBANK & HIRSCH
ATTORNEYS

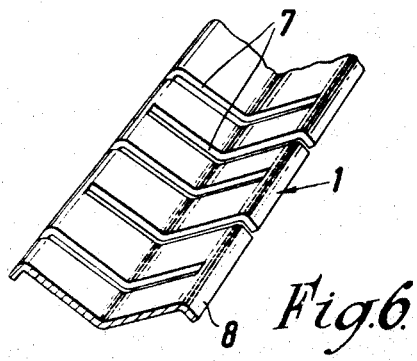
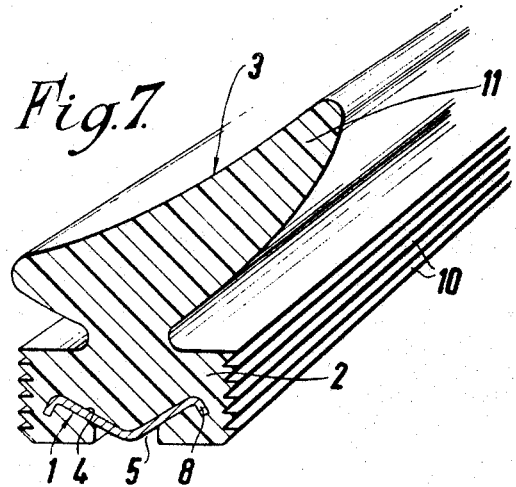

United States Patent Office 3,394,044
Patented July 23, 1968

3,394,044
SEALING STRIP FOR U-SHAPED CHANNEL
Robert Granville Bright, Leamington Spa, England, assignor to Bright Manufacturing Company Limited, Coventry, England
Filed Jan. 18, 1965, Ser. No. 426,334
2 Claims. (Cl. 161—117)

ABSTRACT OF THE DISCLOSURE

This invention relates to a sealing strip for use with a supporting structure having an elongated substantially U-shaped channel, the sealing strip comprising a resilient elongated member having a longitudinal transverse groove therein and a longitudinal slot extending at right angles to said groove and having its inner end in communication with said groove and its outer end exposed to the exterior so that a transversely deformable stiffening member may be readily inserted into said groove to extend the length thereof.

Furthermore, the invention relates to sealing strips, trimming strips, beadings, window channels and the like which are mounted in a channel shaped groove for example a channel shaped groove in a vehicle body or door, the strip being moulded or extruded from a comparatively soft material such as neoprene sponge, sponge rubber or other suitable soft but resilient material.

In the case of a sealing strip for motor vehicles the part projecting from the channel shaped groove will, if the groove is associated with the vehicle body, engage a door or other closure member or if mounted in a groove in the door or other closure member will engage the vehicle body to ensure a good weathertight seal. The strip in accordance with the present invention is cheap to produce and can be quickly secured in position without the use of clips or other attachment members.

A strip of the kind set forth and in accordance with the present invention includes a base portion adapted to enter a channel shaped groove in a supporting structure, the base containing an internal stiffening or expansion member extending lengthwise of the strip and transversely of the base.

Preferably the internal stiffening member is so constructed that it is resilient in a lateral direction, the internal stiffening member being compressed transversely as a result of pressing the base into the channel shaped groove, the stiffening member tending to resume its initial shape and thus exerting outward pressure on the sides of the channel.

Referring to the accompanying drawings:

FIGURE 6 is a fragmentary perspective view of a further type of stiffening member; and FIGURE 7 is a sectional perspective view showing the stiffening member illustrated in FIGURE 6 in position in a sealing strip.

Figure 1:
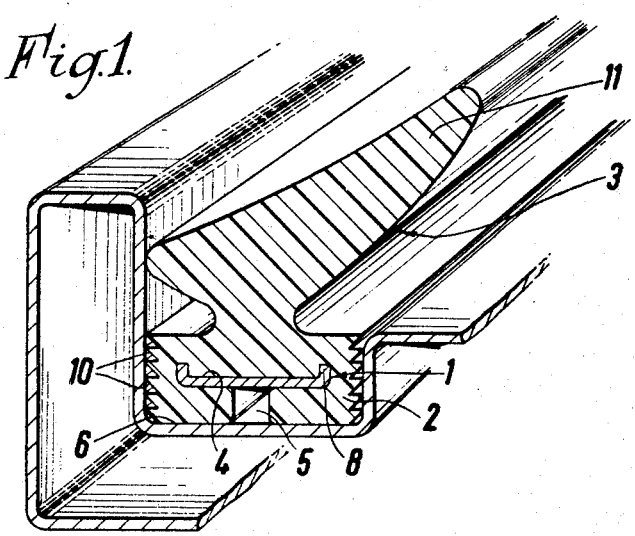
FIGURE 1 is a sectional perspective view showing a sealing strip incorporating an internal stiffening member and mounted in a channel shaped groove.

The stiffening member generally indicated by reference numeral 1 may be moulded into the base 2 of the sealing strip or the like generally indicated by reference numeral 3, but is preferably located with a slot 4, the stiffening member being introduced into the slot through the open mouth 5.

As shown in FIGURE 1 the base 2 of the strip is pressed into the channel shaped groove 6 in the body or other part and is resiliently held in position therein.

The stiffening member lies lengthwise of the base and transversely thereof to provide a support for the compartively soft base, the strip including the base being preferably moulded or extruded from neoprene sponge, sponge rubber or other soft but resilient material.

Figure 2:
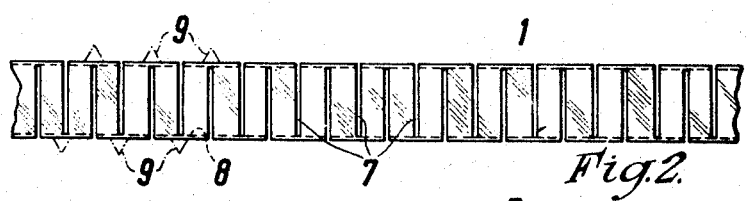
FIGURES 2 to 5 illustrate four alternative forms of stiffening members.
Figure 3:
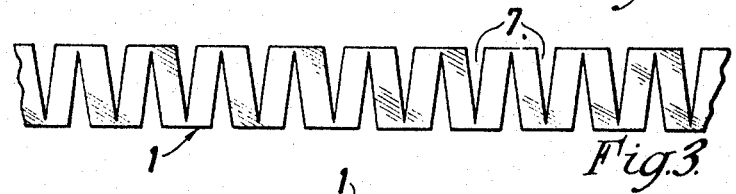

The stiffening member may be constructed from any suitable material such as for example strip metal or wire and is preferably formed with staggered slits 7 as in FIGURE 2, 3 or 6, the slits extending inwardly from opposite edges across almost the full width of the strip and enabling the strip to be bent in a plane containing the stiffening member in addition to being bent in a plane at right angles to the plane containing the stiffening member, thus rendering the strip virtually capable of universal bending movement, the strip being as shown in FIGURES 1 and 2 formed if required with its longitudinal edges 8 bent at right angles to the plane of the strips.

The stiffening member may for example be stretched longitudinally so that the slits 7 assume a V shape as in FIGURE 3 thus economising in material, the stretching operation considerably increasing the effective length of the stiffening material.

Figure 4:
Figure 5:
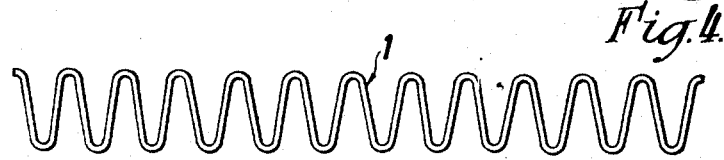

In FIGURES 4 and 5 the stiffening member is bent into sinuous or zig-zag form, the stiffening member shown in FIGURE 5 being composed of wire for example steel wire.

The sinuous or zig-zag formation gives the stiffening member a certain amount of resiliency in a transverse direction, the stiffening member as a result of being compressed laterally when the base is pressed into the groove, tending to assume its initial shape and exerting an outward force on the walls of the groove to hold the base firmly in position therein.

Alternatively the stiffening member may be bent along its longitudinal centre line into broad V or arcuate formation, the act of pressing the base into the groove increasing the bending of the stiffening member, the latter tending to flatten out when in position to exert an outward force on the walls of the groove.

The base 2 is preferably of the rectangular cross-sectional shape shown whilst the part projecting from the groove may have any suitable form to suit the purpose for which the strip is intended, a leaf type effective sealing portion 11 being illustrated in FIGURES 1 and 7.

The longitudinal edges of the stiffening member may be formed with tangs 9 as in FIGURE 2 to hold the stiffening member more firmly in position and the sides of the base 2 of the sealing section may be ribbed as at 10 throughout its length to improve the frictional engagement between the sides of the base and the walls of the channel in which it is mounted.

I claim:

1. A sealing strip for use with a supporting structure having an elongated substantially U-shaped channel, said sealing strip comprising an elongated member of resilient material having a base portion substantially rectangular in cross section and substantially conforming to the cross section of said U-shaped channel strip so as to fit therein under transverse compression, said base having a longitudinal transverse groove therein extending the length thereof and having a slot therein extending the length thereof at right angles to said groove and in communication at its inner end with said groove and having its outer end defining a longitudinal opening in the undersurface of said base portion, a zig-zag stiffening member positioned in said longitudinal groove and extending the length thereof, said stiffening member being laterally resilient whereby when said sealing strip is to be positioned in said U-shaped channel and the longitudinal sides of said base are compressed transversely, the stiffening member by reason of its lateral resiliency will also be compressed to permit movement of the base of said sealing strip into said channel.

2. A strip as claimed in claim 1, wherein the stiffening member is constructed from strip material formed with staggered slits extending inwardly from its opposite longitudinal edges.

References Cited

UNITED STATES PATENTS

| | | | |
|---|---|---|---|
| 1,619,923 | 3/1927 | Faurot | 161 |
| 1,867,312 | 7/1932 | Gaines | 49—441 |
| 1,880,696 | 10/1932 | Beynon | 49—440 |
| 2,313,419 | 3/1943 | Bush | 161 |
| 2,821,430 | 1/1958 | Grede | 161—106 XR |
| 3,068,136 | 12/1962 | Reid | 156—200 |
| 3,250,663 | 5/1966 | Sharp et al. | 161—101 XR |
| 3,290,826 | 12/1966 | Weimar | 49—440 |

ROBERT F. BURNETT, *Primary Examiner.*

R. H. CRISS, *Assistant Examiner.*